(12) United States Patent
Ogasahara (10) Patent No.: US 7,843,942 B2
(45) Date of Patent: Nov. 30, 2010

(54) NODE AND FAIR RATE CALCULATING METHOD

(75) Inventor: Daisaku Ogasahara, Tokyo (JP)

(73) Assignee: NEC Corporation, Tokyo (JP)

( * ) Notice: Subject to any disclaimer, the term of this patent is extended or adjusted under 35 U.S.C. 154(b) by 153 days.

(21) Appl. No.: 12/043,650

(22) Filed: Mar. 6, 2008

(65) Prior Publication Data
US 2008/0219166 A1    Sep. 11, 2008

(30) Foreign Application Priority Data
Mar. 7, 2007    (JP)    ............... 2007-057031

(51) Int. Cl.
H04L 12/56    (2006.01)
(52) U.S. Cl. .................. 370/395.41; 370/235; 370/468
(58) Field of Classification Search ................ 370/235, 370/395.41, 468
See application file for complete search history.

(56) References Cited

U.S. PATENT DOCUMENTS

| 7,436,852 | B2* | 10/2008 | Nam et al. .................. 370/468 |
| 2003/0012129 | A1* | 1/2003 | Lee et al. .................... 370/216 |
| 2003/0163593 | A1* | 8/2003 | Knightly ....................... 709/251 |
| 2004/0100984 | A1* | 5/2004 | Nam et al. .................. 370/438 |
| 2005/0100031 | A1* | 5/2005 | Choe et al. .................. 370/404 |
| 2005/0141417 | A1* | 6/2005 | Huang et al. ................ 370/229 |
| 2006/0209683 | A1* | 9/2006 | Nishimura ................... 370/222 |
| 2006/0250986 | A1* | 11/2006 | Alharbi et al. ............. 370/258 |
| 2006/0280122 | A1* | 12/2006 | Honma et al. ............... 370/235 |

FOREIGN PATENT DOCUMENTS

| JP | 08-214004 | 8/1996 |
| JP | 09-074420 | 3/1997 |
| JP | 2004-289799 | 10/2004 |
| JP | 2006-3453339 | 12/2006 |

OTHER PUBLICATIONS

IEEE Standards 802.17 "Part 17: Resilient packet ring (RPR) access method & physical layer specifications," "10. Fairness," IEEE (Institute of Electrical and Electronics Engineers, Inc), 2004, p. 225-284.

* cited by examiner

Primary Examiner—Donald L Mills
(74) Attorney, Agent, or Firm—Scully, Scott, Murphy & Presser, P.C.

(57) ABSTRACT

A topology database stores the number of RPR nodes which belong to an RPR network. A traffic rate measuring unit sends a variety of parameters for calculating a communication band available to a fairness controlled traffic packet to a fairness control unit. Upon detection of congestion, the fairness control unit calculates a communication band available for transmission of the fairness controlled traffic packet from the parameters sent from the traffic rate measuring unit, divides the communication band by the number of nodes to find an initial value for a fair rate.

12 Claims, 8 Drawing Sheets

NODE AND FAIR RATE CALCULATING METHOD

This application is based upon and claims the benefit of priority from Japanese patent application No. 2007-057031, filed on Mar. 7, 2007, the disclosure of which is incorporated herein in its entirety by reference.

BACKGROUND OF THE INVENTION

1. Field of the Invention

The present invention relates to a node for conducting a band control in order that a communication band of a link is fairly used by a plurality of traffic packets, and a fair rate calculating method used by the node.

2. Description of the Related Art

In the Internet, a multiplexing scheme called a "packet multiplexing scheme" is used instead of a time-division multiplexing scheme which previously allocates a predetermined communication band to a traffic packet.

In the packet multiplexing scheme, a communication band is shared by all traffic packets. A network node (hereinafter simply called the "node") can transmit or receive a traffic packet when there is an available communication band which is not used by another traffic packet. In other words, a traffic packet can be transmitted or received when other traffic packets are at a low communication rate and the communication band has a free scope.

Here, the traffic packet refers to a set of data in predetermined units transmitted from a node within a communication network. For example, in a communication network to which RPR (Resilient Packet Ring) is applied, a frame (RPR frame) transmitted from an RPR node corresponds to data in predetermined units, and a set of RPR frames corresponds to a traffic packet. Also, a communication band used by a traffic packet is defined by a value which is calculated by dividing a total sum of data included in the traffic packet in predetermined units by a time taken for transmission/reception (i.e., a communication rate). However, for actually calculating a communication rate of a traffic packet at a node, another simple calculation method may be used in some cases, not limited to the calculation method according to the foregoing definition.

In the time-division multiplexing scheme, even if a communication band allocated to a certain traffic packet is not used, another traffic packet is prohibited from using the communication band. In the packet multiplexing scheme, on the other hand, another traffic packet is permitted to use a free band. Thus, the packet multiplexing scheme provides a higher band utilization efficiency than the time-division multiplexing scheme. This effect is called a statistic multiplexing effect of the packet multiplexing scheme.

However, in the packet multiplexing scheme, when a particular link of a communication system is utilized by multiple traffic packets at the same time, the transfer of traffic packets can be delayed or partially discarded if the traffic packet amount exceeds a communication band of the link (congestion). In this event, communications become unstable, or communications are broken.

To solve such a problem, a variety of band control methods have been devised for ensuring a predetermined communication band for a particular traffic in the packet multiplexing scheme as well as the time-division multiplexing scheme, preferentially transmitting traffic packets having higher priorities, and the like.

As one of such band control methods, there is a band control method for fairly using a communication band of an arbitrary link within a communication system amount all traffic packets which use the link. Here, "fairly using a communication band of a link amount traffic packets" involves equally dividing the communication band of the link by the number of traffic packets which use the link, and controls such that the communication band of each traffic packet does not exceed the value. For example, assume that the communication band of the link is 10 Gbps, and there are four traffic packets A, B, C, D. In this scenario, the communication band of each traffic packet is controlled so as not to exceed 2.5 Gbps (=10 Gbps/4).

As an example of such band control, there is a band control method called "fairness" which is used by RPR standardized in IEEE (the Institute of Electrical and Electronics Engineers) in 2004. Fairness is described in IEEE Standards 802.17 Part 17: Resilient packet ring (RPR) access method & physical layer specifications,""10.Fairness," IEEE (Institute of Electrical and Electronics Engineers, Inc), 2004, p. 225-284 (hereinafter called Non-Patent Document 1). In the following, a traffic packet, the communication band of which is controlled in accordance with fairness is called a "fairness controlled traffic packet".

A communication network to which RPR is applied (hereinafter called the "RPR network") is a double ring network which comprises a ring (ringlet) for transferring frames in the clockwise direction, and a ring (ringlet) for transferring frames in the counter-clockwise direction). The ringlet refers to a communication path of the RPR network.

In the RPR network, a band guaranteed traffic packet for which a communication band for the traffic packet is guaranteed, and a best-effort traffic packet for which no communication band is guaranteed are defined. Guaranteeing a communication band for a traffic packet means that a communication band required for transmitting/receiving the traffic packet is ensured.

A band guaranteed traffic packet is exclusively allocated a predetermined communication band beforehand, and is transmitted preferentially to a best-effort traffic packet. The band guaranteed traffic packet is guaranteed for communication at all times at a communication rate equal to or lower than the guaranteed band. However, if there are a plurality of band guaranteed traffic packets within a communication network, which share the same link, it is necessary to set a guaranteed band for each band guaranteed traffic packet such that the total sum of the communication bands allocated to these traffic packets is equal to or smaller than a minimum value of the communication band of the shared link.

On the other hand, the best-effort traffic packet is a normal traffic packet in the packet multiplexing scheme, and is a traffic packet which can be transmitted using an unused communication band, if any, as mentioned above.

In RPR, Class A and Class B are defined as service classes for the band guaranteed traffic packets. Also, in RPR, Class C is defined as a service class for the best-effort traffic packet. Further, Class A is sub-divided into Class A0 and Class A1, while Class B is sub-divided into Class B-CIR and Class B-EIR. While Class B is defined as a service class for the band guaranteed traffic packet, a traffic packet of Class-B-EIR is a best-effort traffic packet, as will be later described.

Class A0 is a service class which exclusively allocates a predetermined band beforehand. Also, even if the communication band is not used by the traffic packet of Class A0, the communication band cannot be used by any traffic packet of other service classes.

Class A1 is also a band guaranteed service class which allocates a predetermined communication band beforehand. However, when the communication band is not used by the traffic packet of Class A1, the unused band can be used by a fairness controlled traffic packet. Specifically, when a communication rate of a traffic packet of Class A1 is lower than a communication band previously allocated to Class A1, the band not used by a traffic packet of Class A1 can be used to transmit fairness controlled traffic packet.

The traffic packet of Class B is also allocated a predetermined communication band beforehand. However, when the traffic packet of Class B is transmitted in a communication band larger than the allocated one, the traffic packet within the communication band is transmitted as a traffic packet of Class B-CIR, while a traffic packet exceeding the communication band is transmitted as Class B-EIR.

Class B-CIR is a service class substantially similar to Class A1. However, both differ in the following aspects.

The traffic packets of Class A0 and Class A1 are transmitted preferentially to the traffic packet of Class B-CIR. Also, the traffic packets of Class A0 and Class A1 are guaranteed a minimum latency, whereas the traffic packet of Class B-CIR is not guaranteed such a latency.

Class B-EIR is a best-effort traffic similar to Class C. However, Class B-EIR is given a higher priority of transmission than Class C.

In RPR, the best effort traffic packet is determined as a fairness controlled traffic packet. Specifically, in RPR, the traffic packets of best-effort Class B-EIR and Class C are fairness controlled traffic packets.

In the following, a description will be given of the operation of a general node when congestion occurs in an RPR network.

A head node (Head Node) refers to a node which exists immediately upstream of a link on which congestion has occurred. When congestion occurs on a link, the head node notifies nodes located upstream of the node itself of a fair rate (FairRate) indicative of an upper limit value for a communication band for a fairness controlled traffic packet which passes the nodes. In this event, the head node transmits a control frame (fairness frame) which stores the fair rate in the nodes located upstream of the node itself. An upstream node which has received the fairness frame from the head node executes a band control such that the communication band of a fairness controlled traffic packet which uses the link on which the congestion has occurred is equal to or lower than the fair rate.

Also, the nodes located upstream of the head node notify its immediately upstream node of the fair rate notified from the head node using the fairness frame when the communication band of the fairness controlled traffic packet received from the immediately upstream node is equal to or higher than the fair rate.

On the other hand, the communication band of a fairness controlled traffic packet received from the immediately upstream node is lower than the fair rate, and the immediately upstream node is then notified, using the fairness frame, that the communication band of the fairness controlled traffic packet need not be restricted. For example, a fairness frame which sets the value of a full rate (FullRate) as the Fair rate is transmitted to the immediately upstream node.

Upon receipt of a fairness frame, whose fair rate is not the full rate, the node executes a band control such that the communication band of the fairness controlled traffic packet which uses the link on which the congestion has occurred is equal to or lower than the Fair rate.

A tail node (Tail Node) refers to a node which receives a fairness frame, whose fair rate is not the full rate, and which transmits a fairness frame, wose fair rate is the full rate. Also, a congestion domain (Congestion Domain) refers to a communication path from the head node to the tail node.

Upon receipt of a fairness frame, whose fair rate is the full rate, from an immediately downstream node, a node transmits a similar fairness frame to the upstream node. Accordingly, nodes upstream of the tail node do not conduct the band control for the fairness controlled traffic packet to be transmitted.

In the foregoing manner, in the RPR network, even if congestion occurs, the communication band of a link on which the congestion occurs is not used exclusively by a particular node, but can be fairly used by a plurality of nodes.

The aforementioned Non-Patent Document 1 defines that the fair rate initially notified by the head node is set to a communication rate of a fairness controlled traffic packet transmitted from the head node into the RPR network immediately before the congestion is detected.

Japanese Patent Application Laid-open No. 2006-345339, for example, describes a node which sends frames in accordance with a fair rate notified from a downstream node.

Incidentally, when a communication rate of a fairness controlled traffic packet transmitted from the head node into the RPR network immediately before the congestion is detected is defined to be the fair rate initially notified by the head node, an initial value for the fair rate notified by the head node can be zero in some cases. In this event, the transmission of fairness controlled traffic packets is stopped from nodes upstream of the head node, resulting in an interrupted communication and lower band utilization efficiency of the communication system, Specifically, the initial value for the fair rate becomes zero in the following scenario.

For example, when congestion occurs at the head node by starting a transmission of a best-effort traffic packet which has not been so far transmitted, the initial value for the fair rate becomes zero.

Also, the initial value for the fair rate becomes zero when congestion occurs in the head node, in which no best-effort traffic packet has been so far transmitted, due to exhaustion of a communication band for a best-effort traffic packet transmitted from an upstream node as a result of a communication band reserved by starting a transmission of a traffic packet of Class B.

In such scenarios, nodes upstream of the head node must once stop the transmission of best-effort traffic packets which has been so far transmitted. As the fair rate is gradually increased by the head node executing a fair rate adjusting process, the upstream nodes can resume the transmission of best-effort traffic packets.

Accordingly, since upstream nodes stop the transmission of best-effort traffic packets from the time they are notified of the initial value for the fair rate equal to zero to the time that the transmission is resumed, the communication system is largely reduced in band utilization efficiency.

The above and other objects, features, and advantages of the present invention will become apparent from the following description with reference to the accompanying drawings, which illustrate examples of the present invention.

SUMMARY OF THE INVENTION

It is therefore an object of the present invention to provide a node, a communication system, and a method which are capable of restraining interrupted communications to improve the communication band utilization efficiency in a system to which a band control function is applied for sharing communication band among nodes.

To achieve the above object, a node which serves as a head node measures the communication band of the fairness controlled traffic packet sourced from the node itself, and the communication band of the fairness controlled traffic packet which passes through the node itself, and calculates the fair rate by dividing a communication band available for a transmission of the fairness controlled traffic packet, found by using the communication band of the fairness controlled traffic packet sourced from the node itself and the communication band of the fairness controlled traffic packet which passes through the node itself, by the number of nodes which transmit the fairness controlled traffic packet using a link on which congestion occurs.

Then, the calculated fair rate is notified to upstream nodes using a fairness frame.

DETAILED DESCRIPTION OF THE PREFERRED EMBODIMENTS

First Embodiment

Figure 1:
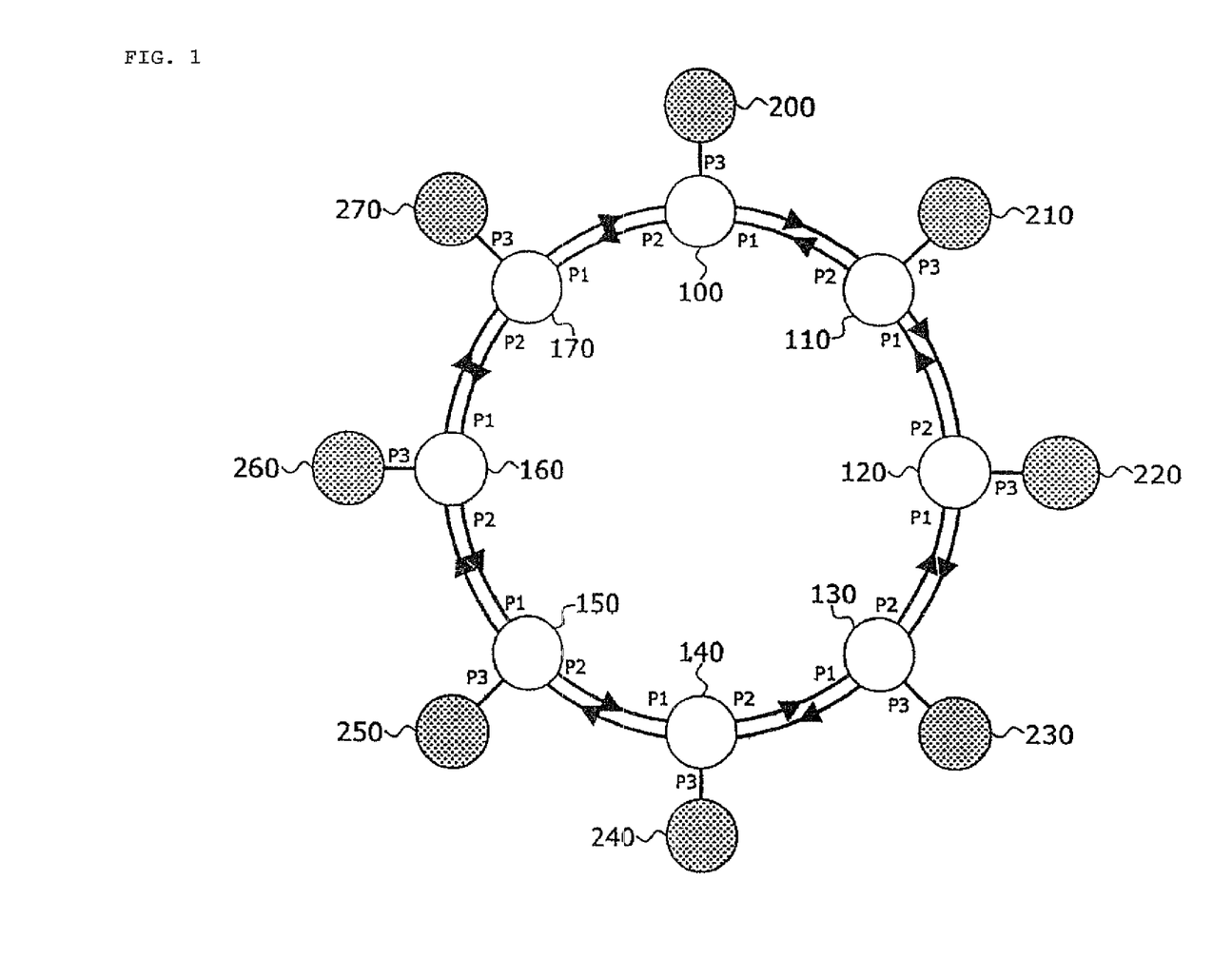
FIG. 1 is a schematic diagram showing an exemplary communication network including nodes of the present invention.

FIG. 1 is a schematic diagram showing an exemplary communication network including nodes of the present invention. FIG. 1 shows an RPR network which comprises eight nodes 100-170 as a communication network.

Nodes 100-170 are nodes which operate in conformity to "IEEE Standards 802.17," and nodes 100-170 are hereinafter called the "RPR nodes."

RPR nodes 100-170 of this embodiment differ from the RPR node presented in the section of DESCRIPTION OF RELATED ART in a method of determining a fair rate initially notified to the remaining nodes as a head node (i.e., an initial value for the fair rate). In the RPR network shown in FIG. 1, terminals 200-270, which do not belong to a ring net, are connected to RPR nodes 100-170, respectively.

RPR nodes 100-1700 transmit/receive data to/from terminals 200-270 by transmitting/receiving Ethernet frames. Ethernet is a tradename of Xerox Co., U.S.A.

Upon receipt of an Ethernet frame from a terminal connected to the local node, a RPR node stores the Ethernet frame in a payload to generate a frame (called the "RPR frame") which is transmitted to other RPR nodes. In this event, the RPR node transmits the RPR frame to an RPR node connected to a terminal which is the destination of the Ethernet frame.

Also, upon receipt of an RPR frame destined for the local node, a RPR node extracts an Ethernet frame from the RPR frame, and transmits the Ethernet frame to a terminal connected to the node itself.

Each RPR node 100-170 comprises ports P1-P3. Ports P1, P2 are ports for transmitting/receiving a RPR frame to/from adjacent RPR nodes. Port P3 is a port for transmitting/receiving an Ethernet frame to/from a terminal.

Figure 2:
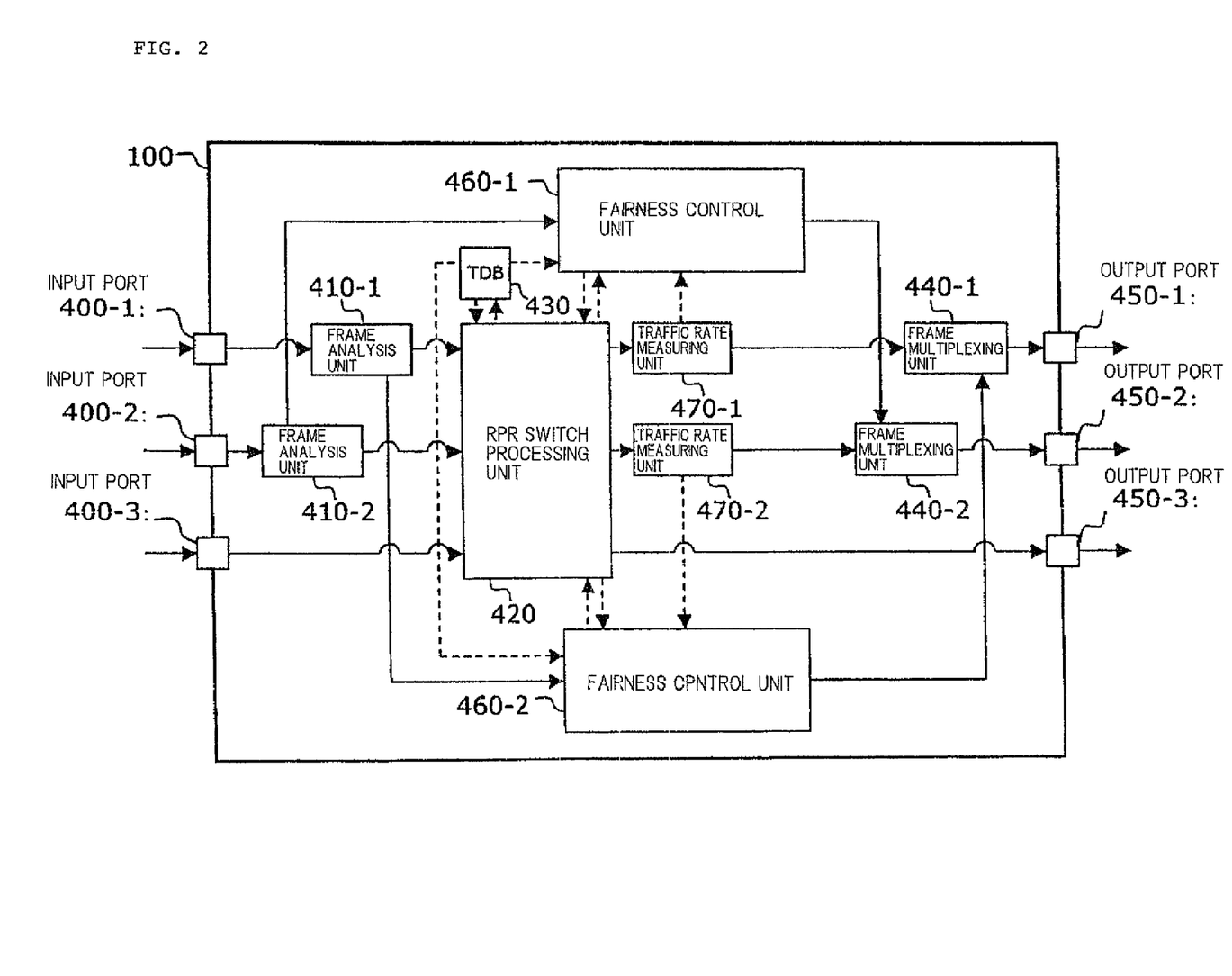
FIG. 2 is a block diagram showing the configuration of a node according to a first embodiment.

FIG. 2 is a block diagram showing the configuration of the node according to the first embodiment.

In the following, the configuration of the node according to this embodiment will be described giving as an example RPR node 100 shown in FIG. 1, but other RPR nodes 110-170 are similar in configuration to RPR node 100.

As shown in FIG. 2, RPR node 100 comprises input ports 400-1-400-3; frame analysis units 410-1-410-2; RPR switch processing unit 420; topology database (Topology DataBase) 430; frame multiplexing units 440-1-440-2; output ports 450-1-450-3; fairness control units 460-1-460-2; and traffic rate measuring units 470-1-470-2. In the following, the topology database is abbreviated as TDB.

Input ports 400-1-400-3 are reception ports (through which frames are received) in ports P1-P3 of RPR node 100 shown in FIG. 1.

Input ports 400-1-400-2 are ports for receiving RPR frames transmitted from adjacent RPR nodes. Input port 400-1 is a port for receiving an RPR frame transmitted from an adjacent RPR node in the clockwise direction (RPR node 110 in this example). Input port 400-2 is a port for receiving an RPR frame transmitted from an adjacent RPR node in the counter-clockwise direction (RPR node 170 in this example). Input port 400-3 is a port for receiving an Ethernet frame transmitted from a terminal (terminal 200 in this example).

Output ports 450-1-450-3 are transmission port (ports for transmitting frames) in ports P1-P3 of RPR node 100 shown in FIG. 1.

Output ports 450-1-450-2 are ports for transmitting RPR frames to adjacent nodes. Output port 450-1 is a port for transmitting an RPR frame to an adjacent RPR node in the clockwise direction (RPR node 110 in this example). Output port 450-2 is a port for transmitting an RPR frame to an adjacent RPR node in the counter-clockwise direction (RPR node 170 in this example). Output port 450-3 is a port for transmitting an Ethernet frame to a terminal (terminal 200 in this example).

Frame analysis unit 410-1, 410-2 determines whether or not an RPR frame received by input port 400-1, 400-2 is a fairness frame. Frame analysis unit 410-1, 410-2 references, for example, a header of a received RPR frame, and determines that the received RPR frame is a fairness frame when the header includes information indicative of a fairness frame. On the other hand, when the header includes information indicative of another type of frame, frame analysis unit 410-1, 410-2 determines that the received RPR frame is not a fairness frame.

Frame analysis unit 410-1 determines whether or not an RPR frame received from an adjacent RPR node (RPR node 110 in this example) is a fairness frame, and sends the RPR frame to fairness control unit 460-2 when it determines that the received RPR frame is a fairness frame. On the other hand, when determining that the received RPR frame is not a fairness frame, frame analysis unit 410-1 sends the RPR frame to RPR switch processing unit 420.

Likewise, frame analysis unit 410-2 determines whether or not an RPR frame received from an adjacent RPR node (RPR node 170 in this example) is a fairness frame, and sends the RPR Frame to fairness control unit 460-1 when it determines that the received frame is a fairness frame. On the other hand, when determining that the received frame is not a fairness frame, frame analysis unit 410-2 sends the RPR frame to RPR switch processing unit 420.

RPR switch processing unit 420 executes a variety of processes defined by "IEEE Standards 802.17."

The processes executed by RPR switch processing unit 420 includes a process for transferring an RPR frame received from adjacent RPR nodes (RPR node 110 and RPR node 170 in this example); a process for generating an RPR frame including an Ethernet frame received from a terminal (terminal 200 in this example) and transmitting the RPR frame into the RPR network; a process for extracting an Ethernet frame from an RPR frame destined to the local node to transmit the Ethernet frame to terminal 200; a process for managing topology information of the RPR network in accordance with Topology Discovery Protocol (TDP); a process for managing the RPR network in accordance with OAM (Operations, Administration, Maintenance); and the like.

RPR switch processing unit 420 sends a frame transferred to the adjacent RPR node in the clockwise direction (RPR node 110 in this example) to frame multiplexing unit 440-1 through traffic measuring unit 470-1. Likewise, RPR switch processing unit 420 sends a frame transferred to the adjacent RPR node in the counter-clockwise direction (RPR node 170 in this example) to frame multiplexing unit 440-2 through traffic measuring unit 470-2.

In this regard, detailed descriptions on the processes of RPR switch processing 420 are omitted except for those related to operations involved in the present invention.

RPR switch processing unit 420 comprises a buffer corresponding to output port 450-1, and a buffer corresponding to output port 450-2.

The buffer corresponding to output port 450-1 holds a fairness controlled traffic packet among the traffic packets which are scheduled to be transmitted from output port 450-1. Likewise, the buffer corresponding to output port 450-2 holds a fairness controlled traffic packet among those traffic packets which are scheduled to be transmitted from output port 450-2. When congestion occurs, larger amounts of these buffers are used. Accordingly, it can be determined that congestion occurs when the amount of memory used for these buffers reach a predetermined threshold or more. For example, when the amount of memory used for these buffer corresponding to output port 450-1 exceeds the threshold, it can be determined that congestion occurs on a link for transmitting from RPR node 100 to RPR node 110. Likewise, when the amount of memory that is used for the buffer corresponding to output port 450-2 exceeds the threshold, it can be determined that congestion occurs on a link for transmitting from RPR node 100 to RPR node 170. When the amount of memory that is used for the buffer corresponding to output port 450-1 exceeds the threshold, RPR switch processing unit 420 notifies fairness control unit 460-1 to that effect. Also, when the amount of memory that is used for the buffer corresponding to output port 450-2 exceeds the threshold, RPR switch processing unit 420 notifies fairness control unit 460-2 to that effect.

TDB 430 is a database for registering therein topology information of the RPR network shown in FIG. 1, produced in the result of TDP executed by RPR switch processing unit 420 of RPR node 100. TDB 430 is registered with the number of RPR nodes which make up the RPR network, the position of each RPR node, information on failures on each link, and the like as topology information by RPR switch processing unit 420. The topology information registered in TDB 430 is referenced by fairness control units 460-1, 460-2, and RPR switch processing unit 420. Fairness control units 460-1, 460-2 reference the number of RPR nodes which make up the RPR network for use in calculating the initial value for the fair rate.

Frame multiplexing unit 440-1 multiplexes a data frame transmitted from traffic rate measuring unit 470-1 and a fairness frame transmitted from fairness control unit 460-2. Then, frame multiplexing unit 440-1 transmits the multiplexed frame to the adjacent RPR node in the clockwise direction (RPR node 110 in this example) through output port 450-1.

Likewise, frame multiplexing unit 440-2 multiplexes a data frame transmitted from traffic rate measuring unit 470-2 and a fairness frame transmitted from fairness control unit 4601. Then, frame multiplexing unit 440-2 transmits the multiplexed frame to the adjacent RPR node in the counter-clockwise direction (RPR node 170 in this example) through output port 450-2.

Fairness control unit 460-1 and fairness control unit 460-2 execute a variety of processes related to the fairness defined in "IEEE Standards 802.17." The processes executed by fairness control unit 460-1 and fairness control unit 460-2 include detection of congestion at output port 450-1 or output port 450-2 of the local node; calculation of the fair rate; generation and transmission of a fairness frame; analysis on a fairness frame received from an adjacent node; notification of band control information to RPR switch processing unit 420 of RPR node 100; and the like.

Upon receipt of a fairness frame from frame analysis unit 410-2, fairness control unit 460-1 extracts a fair rate from the fairness frame, and notifies RPR switch processing unit 420 of the fair rate. RPR switch processing unit 420 sets the fair rate to an upper limit value, and controls a communication band of a fairness controlled frame transmitted from output port 450-2 to be equal to or less than the upper limit value. Likewise, upon receipt of a fairness frame from frame analysis unit 410-1, fairness control unit 460-2 extracts a fair rate from the fairness frame, and notifies RPR switch processing unit 420 of the fair rate. RPR switch processing unit 420 sets the fair rate to an upper limit value, and controls a communication band of a fairness controlled frame transmitted from output port 450-1 to be equal to or less than the upper limit value.

In this regard, detailed descriptions on the processes of fairness control unit 460-1 and fairness control unit 460-2 are omitted except for those related to operations involved in the present invention.

Fairness control unit 460-1, 460-2 determines whether or not congestion occurs between RPR node 100 and an adjacent downstream RPR node to which an RPR frame is transmitted. For example, upon receipt of notification from RPR switch processing unit 420 that the amount of memory that is used for the buffer corresponding to output port 450-1 has exceeded the threshold, fairness control unit 460-1 determines that congestion occurs between the local node and an adjacent node (RPR node 1 10 in this example) which receives an RPR frame transmitted from output port 450-1. Likewise, upon receipt of notification from RPR switch processing unit 420 that the amount of memory that is used for the buffer corresponding to output port 450-2 has exceeded the threshold, fairness control unit 460-2 determines that congestion occurs between the local node and an adjacent node (RPR node 170 in this example) which receives RPR frame transmitted from output port 450-2.

Fairness control unit 460-1 calculates an initial value for a fair rate using parameters sent from traffic rate calculation unit 470-1, and the number of RPR nodes which make up the RPR network, when it determines that congestion occurs between the local node and the adjacent node which received an RPR frame transmitted from output port 450-1. In this event, fairness control unit 460-1 retrieves the number of RPR nodes which make up the RPR network from TDB 430. Likewise, fairness control unit 460-2 calculates an initial value for a fair rate using parameters sent from traffic rate calculation unit 470-2 and the number of RPR nodes which make up the RPR network, when it determines that congestion occurs between the local node and the adjacent node which receives an RPR frame transmitted from output port 450-2. In this event, fairness control unit 460-2 retrieves the number of RPR nodes which make up the RPR network from TDB 430. A method of calculating the initial value for the fair rate, executed by fairness control unit 460-1, 460-2 will be described later.

Traffic rate measuring unit 470-1 executes a process for measuring various traffic rates defined in "IEEE Standards 802.17." Then, traffic rate measuring unit 470-1 notifies fairness control unit 460-1 of a value calculated from a traffic rate measuring result and measuring result as the aforementioned parameters. Likewise, traffic rate measuring unit 470-2 executes a process for measuring various traffic rates defined in "IEEE Standards 802.17." Then, traffic rate measuring unit 470-2 notifies fairness control unit 460-1 of a value calculated from a traffic rate measuring result and measuring result as the aforementioned parameters.

Traffic rate measuring units 470-1, 470-2 measure the communication rate of each traffic packet on a type-by-type basis. For example, traffic rate measuring units 470-1, 470-2 measure a communication band (communication rate) of a fairness controlled traffic packet transmitted from the local node which serves as the source. This traffic rate is called "add Rate." Also, traffic rate measuring units 470-1, 470-2 measure a communication band (communication rat) of a traffic packet received from an upstream RPR node and transmitted to a downstream RPR node. Specifically, traffic rate measuring units 470-1, 470-2 measure the communication band (communication rate) of a traffic packet which is transmitted from the upstream RPR node and passes through the local node (here, RPR node 100). This traffic rate is called "fwRate," Also, traffic rate measuring units 470-1, 470-2 measure communication bands (communication rates) of traffic packets other than Class A0. This traffic rate is called "nrXmitRate." Traffic rate measuring units 470-1, 470-2 may measure communication bands for other types of traffic packets.

Traffic rate measuring units 470-1, 470-2 execute a smoothing process using a low-pass filter, a normalization process, and the like for measured traffic rates.

Traffic rate measuring unit 470-1 sends measured or calculated parameters to fairness control unit 460-1. Likewise, traffic rate measuring unit 470-2 sends measured or calculated parameters to fairness control unit 460-2.

For example, traffic rate measuring units 470-1, 470-2 perform a smoothing process for the aforementioned addRate (communication rate of a fairness controlled traffic packet transmitted from the local node), fwRATE (communication rate of a fairness controlled traffic packet which passes through the local node), and nrXmitRate (rate of traffic packets other than Class A0), and sends each rate after the smoothing process is performed to fairness control units 460-1, 460-2. Traffic rate measuring units 470-1, 470-2 may send the rates to fairness control units 460-1, 460-2 without performing the smoothing process of the communication band, but preferably sends values after the smoothing process is performed.

Traffic rate measuring units 470-1, 470-2 may perform the smoothing process for addRate using the following Equation (1):

$$\text{New\_IpAddRate} = \text{Old\_IpAddRate} + (\text{addRate} - \text{Old\_IpAddRate})/\text{IpCoef} \qquad (1)$$

In Equation (1), New_IpAddRate is newly calculated addRate after the smoothing process is performed. Old_IpAddRate is addRate after the smoothing process is performed and which has been calculated at the last time. IpCoef is a constant for the smoothing process, and is previously set by a network manager. As IpCoef has a smaller value, the smoothing is debilitated, causing a change in IpAdd Rate to approach to a change in addRate. On the other hand, as IpCoef has a larger value, the smoothing is enhanced, causing a change in IpAddRate to become slow as compared with a change in add Rate.

With the smoothing process performed in this way, for example, even if add Rate changes from 0 Gbps to 5 Gbps in one second, it takes ten seconds for IpAddRate to change from 0 Gbps to 5 Gbps.

Also, traffic rate measuring units 470-1, 470-2 may perform the smoothing process for fwRate using the following Equation (2):

$$\text{New\_IpFwRate} = \text{Old\_IpFwRate} + (\text{fwrate} - \text{Old\_IpFwRate})/\text{IpCoef} \qquad (2)$$

In Equation (2), New_IpFwRate is newly calculated fwRate after the smoothing process is performed. Old_IpFwRate is fwRate after the smoothing process is performed and which has been calculated at the last time. IpCoef is a constant for the smoothing process.

Also, traffic rate measuring units 470-1, 470-2 may perform the smoothing process for nrXmitRate using the following Equation (3);

$$\text{New\_IpNrXmitRate} = \text{Old\_IpNrXmitRate} + (\text{nrXmitRate} - \text{Old\_IpNrXmitRat})/\text{IpCoef} \qquad (3)$$

In Equation (3), New_IpNrXmitRate is newly calculated nrXmitRate after the smoothing process is performed. Old_IpNrXmitRate is nrXmitRate after the smoothing process is performed and which has been calculated at the last time. IpCoef is a constant for the smoothing process.

Traffic rate measuring units 470-1, 470-2 send IpAddRate, IpFwRate, IpNrXmitRate calculated in the foregoing manner to fairness control unit 460-1, 460-2. By thus sending the values after the smoothing process is performed to fairness control units 460-1, 460-2, fairness control units 460-1, 460-2 can calculate an initial value for the fair rate, even if add Rate and the like change at short periods, without considering such changes.

Also, traffic rate measuring units 470-1, 470-2 subtract a communication band allocated to a traffic packet of Class A0 from a communication band of a link between RPR nodes, and sends the resulting value (this value is called "unreservedRate") to fairness control units 460-1, 460-2, where the communication band of the link between the RPR nodes is a constant. Also, the communication band allocated to the traffic packet of Class A0 is a constant as well. The communication band allocated to the traffic packet of Class A0 is previously set by a network manager. Therefore, unreservedRate is also a constant.

It should be noted that IpAddRate, IpFwRate, IpNrXmitRate, unreservedRate are all defined in the foregoing sense in IEEE Standards 802.17".

Traffic rate measuring units 470-1, 470-2 may send other parameters to fairness control units 460-1, 460-2 except for the foregoing parameters IpAddRate, IpFwRate, IpNrXmitRate, and constant unreservedRate.

Next, a description will be given of a method of calculating an initial value for the fair rate.

The following description will be given of an example where RPR node 100 calculates an initial value for the fair rate when congestion occurs on a link for use in transmission from RPR node 100 to RPR node 110 in the RPR network shown in FIG. 1.

Fairness control unit 460-1 of RPR node 100 determines that congestion occurs when a communication band used by traffic packets of service classes other than Class A0 exceeds a communication band allocated to the traffic packets other than Class A0 in output port 450-1 of RPR node 100.

Also, fairness control unit 460-1 of RPR node 100 also determines that congestion occurs when it is notified from RPR switch processing unit 420 of RPR node 100 that the amount of memory that is used for the buffer for holding fairness controlled traffic packets among traffic packets scheduled to be transmitted from output port 450-1 of RPR node 100 exceeds a predetermined threshold in RPR switch processing unit 420 of RPR node 100.

Upon determining that congestion occurs between RPR node 100 and the downstream adjacent RPR node to which the RPR frame is transmitted, fairness control unit 460-1 of RPR node 100 notifies those RPR nodes located upstream of RPR node 100 of the fair rate. Specifically, a fairness frame which stores the fair rate is transmitted to the upstream nodes. Each RPR node which has received the fairness frame restricts a communication band of a fairness controlled traffic packet in accordance with the fair rate. This results in an additional restriction of a communication band of a fairness controlled traffic packet which passes through a link for transmission from RPR node 100 to RPR node 110.

After determining that congestion occurs, fairness control unit 460-1 calculates the fair rate initially notified to the upstream nodes (initial value for the fair rate) in the following manner Fairness control unit 460-1 first subtracts a communication band previously allocated to a traffic packet of Class A0 and a communication band which has been used by traffic packets of Class A1 and Classes B-CIR upon detection of the congestion from a communication band of the link used for transmission from RPR node 100 to RPR node 110. Then, the initial value for the fair rate is calculated by dividing the value by the number of nodes upstream of RPR node 100. In other words, the initial value for the fair rate is set to a value which is calculated by dividing a communication band available for the fairness controlled traffic packet by the number of nodes upstream of the head node.

Since the RPR network has a ring topology, the number of RPR nodes located upstream of RPR node 100 is the same as the RPR nodes which make up the RPR network.

Fairness control unit 460-1 retrieves the number of RPR nodes which make up the RPR network by referencing TDB 430 of RPR node 100. Then, the number of nodes is used as the number of RPR nodes located upstream of RPR node 100.

Specifically, fairness control unit 460-1 may calculate the initial value for the fair rate using Equation (5) shown below:

$$\text{fairRate} = (\text{unreservedRate} - (Ip\text{NrXmitRate} - (Ip\text{AddRate} + Ip\text{FwRate})))/\text{numStations} \quad (5)$$

In Equation (5), fairRate is the initial value for the fair rate. Also, unreservedRate is a value calculated by subtracting the communication band allocated to the traffic packet of Class A0 from the communication band of the link which connects the adjacent downstream node with RPR node 100. IpNrXmitRate is a smoothed value of the communication rates of traffic packets other than Class A0 which have been transmitted in a direction in which the congestion occurs. IpAddRate is a smoothed value of the communication rate of the fairness controlled traffic packet which has been transmitted by the head node (i.e., RPR node 100 itself) as the source in the direction in which the congestion occurs in the RPR network. IpFwRate is a smoothed value of a communication rate of the fairness controlled traffic packet which is transmitted from a node upstream of the head node (i.e., RPR node 100) and which passes through the head node. numStations is the number of RPR nodes which make up the RPR network.

(IpNrXmitRate−(IpAddRate+IpFwRate)) in Equation (5) means the total of a communication band of a band guaranteed traffic packet that originated from RPR node 100, and a communication band of a band guaranteed traffic packet which passes through RPR node 100.

In this regard, the smoothed value of the traffic packet communication rate is used in order to ignore fluctuations in communication rates at short periods. Nevertheless, the smoothed value may not necessarily be used.

Traffic rate measuring units 470-1, 470-2 may notify fairness control units 460-1, 460-2 of a communication rate before the smoothing process is performed, and fairness control units 460-1, 460-2 may calculate FairRate which is the initial value for the fair rate that uses that value.

Next, a description will be given of a method of calculating an initial value for the fair rate using another equation.

At the time that congestion occurs, a communication band available to fairness controlled traffic packets can be regarded as substantially equal to a communication band actually used by those traffic packets. In other words, at the time that congestion occurs, almost the entire communication band allocated to traffic packets other than Class A0 can be regarded as being used by the traffic packets other than Class A0. Accordingly, the values of unreservedRate and IpNrXmitRate can be regarded as substantially equal. Consequently, fairRate (initial value for the fair rate) shown in Equation (5) can be approximated by the following Equation (6);

$$\text{fairRate}' = (Ip\text{AddRate} + Ip\text{FwRate})/\text{numStations} \quad (6)$$

fairRate' in Equation (6) is an approximate to the initial value for the fair rate.

Fairness control unit 460-1 may calculate the initial value for the fair rate using Equation (6). The initial value for the fair rate can be easier calculated using Equation (6) than using Equation (5).

Also, Traffic rate measuring units 470-1, 470-2 may measure the total sum of the communication rates of fairness controlled traffic packets transmitted to RPR nodes downstream of RPR node 100, and notify fairness control units 460-1, 4602 of the result of the measurement. In this event, traffic rate measuring units 470-1, 470-2 may smooth the total sum of the communication rates of fairness controlled traffic packets, and notify fairness control units 460-1, 460-2 of the result.

When traffic rate measuring units 470-1, 470-2 measure the total sum of the communication bands of fairness controlled traffic packets transmitted to the RPR nodes downstream of RPR node 100 and notify fairness control units 460-1, 460-2 of the total sum, fairness control units 460-1, 460-2 may omit the addition shown in Equation (6) (addition of IpAddRate and IpFwRate) and divide the notified total sum by numStations. Accordingly, the calculation using Equation (6) can be further simplified.

According to this embodiment, since the initial value for the fair rate is calculated in the foregoing manner, it is possible to prevent interrupted communications and lower band utilization efficiency caused by the initial value for the fair rate that is zero. Therefore, the communication system is improved in reliability.

In this regard, there is a mode called "Aggressive mode" in the fairness scheme described in "IEEE Standards 802.17."

Aggressive mode is a mode which employs IpAddRate measured by the head node in real time as the fair rate. Also, there is a mode which employs IpAddRate only for the initial value for the fair rate, and subsequently controls the value of the fair rate in accordance with the degree of congestion.

In Aggressive mode, the fair rate during congestion detection period is defined to be a communication rate of a fairness controlled traffic packet transmitted from the head node within the RPR network, like the initial value for the fair rate. For example, in Aggressive mode, when congestion occurs because the head node does not transmit any of the fairness controlled traffic packet within the RPR network but transmits traffic packets other than the fairness controlled traffic packets (band guaranteed traffic packets), the fair rate becomes zero not only initially but at all times. In this event, when the congestion is solved by upstream nodes which stop the transmission of the fairness controlled traffic packets, the head node notifies the upstream nodes of the full rate. Since the upstream nodes responsively start transmitting fairness controlled traffic packets in concert, congestion occurs again, followed by repetitions of similar processes. Such repeated operations are not preferable in communications of stream data. Also, even in normal data communications, such repeated operations are not preferable because a loss of some data causes a retransmission of all data.

To prevent the repeated operations described above, fairness control units 460-1, 460-2 preferably calculate the fair rate using Equation (5) or Equation (6) even after detection of congestion in Aggressive mode.

The foregoing problem in Aggressive mode can be solved when fairness control units 460-1, 460-2 calculate not only the initial value for the fair rate but also the fair rate after detection of congestion using Equation (5) or Equation (6).

Second Embodiment

A node according to a second embodiment will be described giving an example of an RPR node which forms part of the RPR network shown in FIG. 1, as is the case with the first embodiment.

The first embodiment has shown an example in which a communication band available to fairness controlled traffic packets is divided by the number of RPR nodes which make up the RPR network, and the resulting value is set to the initial value for the fair rate. However, in the RPR network, all RPR nodes do not transmit fairness controlled traffic packets which use a link on which congestion occurs.

In RPR, only those RPR nodes which are included in a congestion region from the head node to the tail node controls the communication rate of fairness controlled traffic packets in accordance with a fair rate notified from the head node. Accordingly, the initial value for the fair rate can be more appropriately calculated if the number of RPR nodes included in the congestion region is used instead of numStations shown in Equation (5) or Equation (6).

However, the head node cannot know which of the RPR nodes located upstream of the head node itself will serve as the tail node upon detection of congestion. For this reason, the head node cannot exactly find the number of RPR nodes located from the head node to the tail node.

The second embodiment estimates the number of RPR nodes which are transmitting fairness controlled traffic packets that pass through a local node. Then, a more appropriate initial value for the fair rate is calculated by calculating the initial value for the fair rate using the estimated number of nodes.

Figure 3:
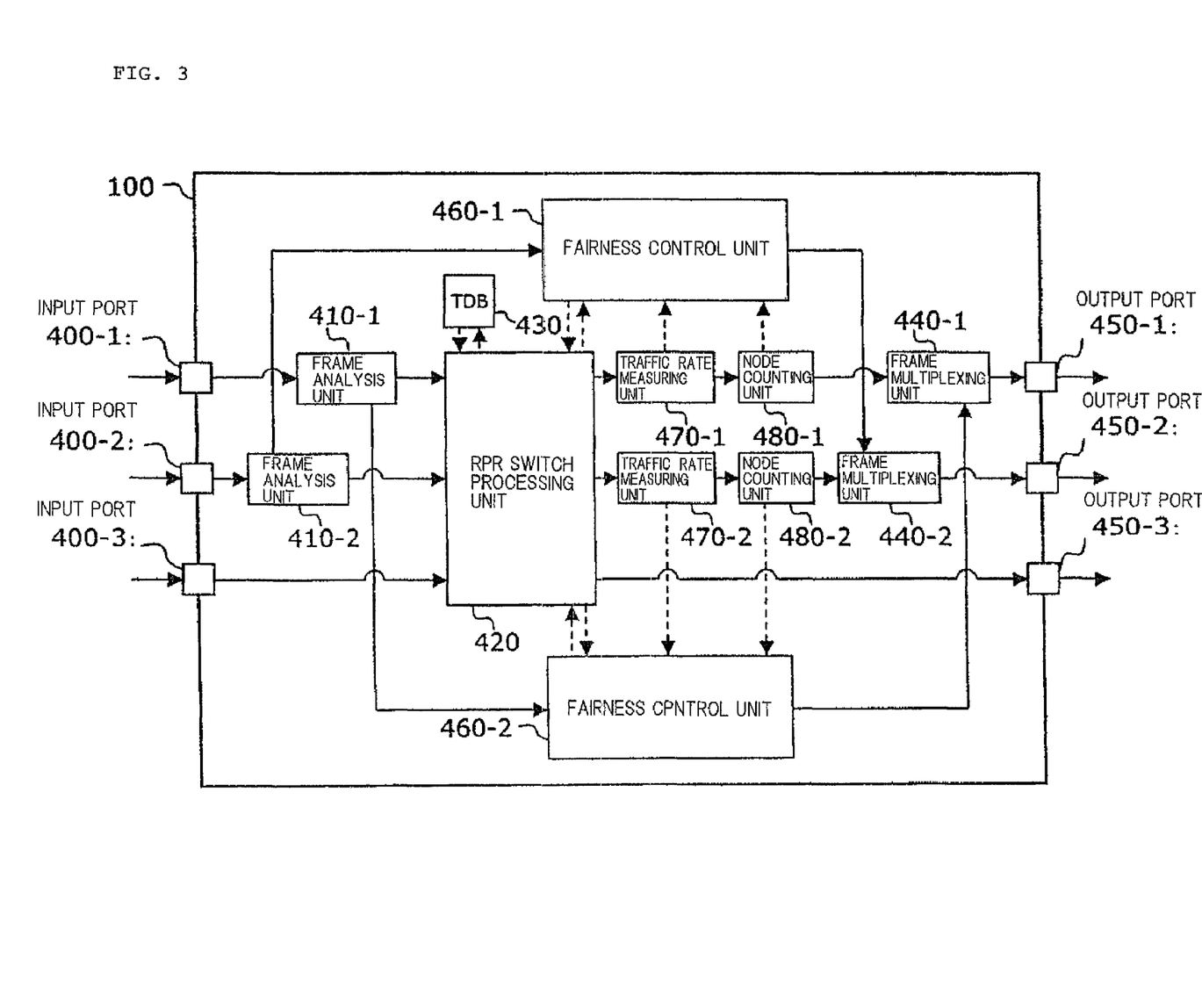
FIG. 3 is a block diagram showing the configuration of a node according to a second embodiment.

FIG. 3 is a block diagram showing the configuration of the node according to the second embodiment.

While the following description will be given of the configuration of the node according to the second embodiment, giving RPR node 100 shown in FIG. 1 as an example, remaining nodes 110-170 shown in FIG. 1 are also similar in configuration to RPR node 100. In this regard, components similar to those shown in FIG. 2 are designated the same reference numerals, and detailed descriptions thereon are omitted.

The node according to the second embodiment comprises node. counting units 480-1, 480-2 added to the node of the first embodiment (see FIG. 2).

Node counting unit 480-1 counts the number of upstream RPR nodes which are transmitting fairness controlled traffic packets that pass through the local node (RPR node 100) for the local node (RPR node 100 itself in this example) with reference to an RPR frame transmitted to the adjacent RPR node in the clockwise direction. Node counting unit 480-1 sends an RPR frame entered from traffic rate measuring unit 470-1 to frame multiplexing unit 440-1 for the local node.

Likewise, node counting unit 480-2 counts the number of upstream RPR nodes which are transmitting fairness controlled traffic packets that pass through the local node (RPR node 100) for the local node (RPR node 100 itself in this example) with reference to an RPR frame transmitted to the adjacent RPR node in the counter-clockwise direction. Node counting unit 480-2 sends an RPR frame entered from traffic rate measuring unit 470-2 to frame multiplexing unit 440-2 for the local node.

Fairness control unit 460-1 calculates an initial value for the fair rate using the number of nodes counted by node counting unit 480-1 instead of "numStations" in Equation (5) or Equation (6). Likewise, fairness control unit 460-2 calculates an initial value for the fair rate using the number of nodes counted by node counting unit 480-2 instead of "numStations" in Equation (5) or Equation (6). Accordingly, in the second embodiment, fairness control units 460-1, 460-2 need not retrieve the value of "numStations" from TDB 430.

Next, a description will be given of the operation of node counting units 480-1, 480-2.

Node counting units 480-1, 480-2 comprise a local storage device (not shown) for holding a node identifier of a source RPR node of a fairness controlled traffic packet transmitted from the traffic rate measuring unit.

While the following description will be given in an example which employs a source RPR MAC address for the node identifier, information other than the source RPR MAC address may be used for the node identifier as long as it is information which is stored in a data frame and with which the source RPR node can be identified.

Also, while the following description will be given of the operation of node counting unit 480-1 shown in FIG. 3, node counting unit 480-2 is similar in operation as well.

Node counting unit 480-1 records a source RPR MAC address of a data frame of fairness controlled traffic packet transmitted from traffic rate measuring unit 470-1 in the local storage device so as not to record the address twice.

Each time node counting unit 480-1 records a source RPR MAC address in the local storage device, node counting unit 480-1 increments a variable indicative of the number of RPR nodes which are transmitting fairness controlled traffic packets that pass through the local node (RPR node 100 in this example). The value of this variable is an estimated value of the number of RPR nodes which are transmitting the fairness controlled traffic packets that pass through the local node.

Figure 4:
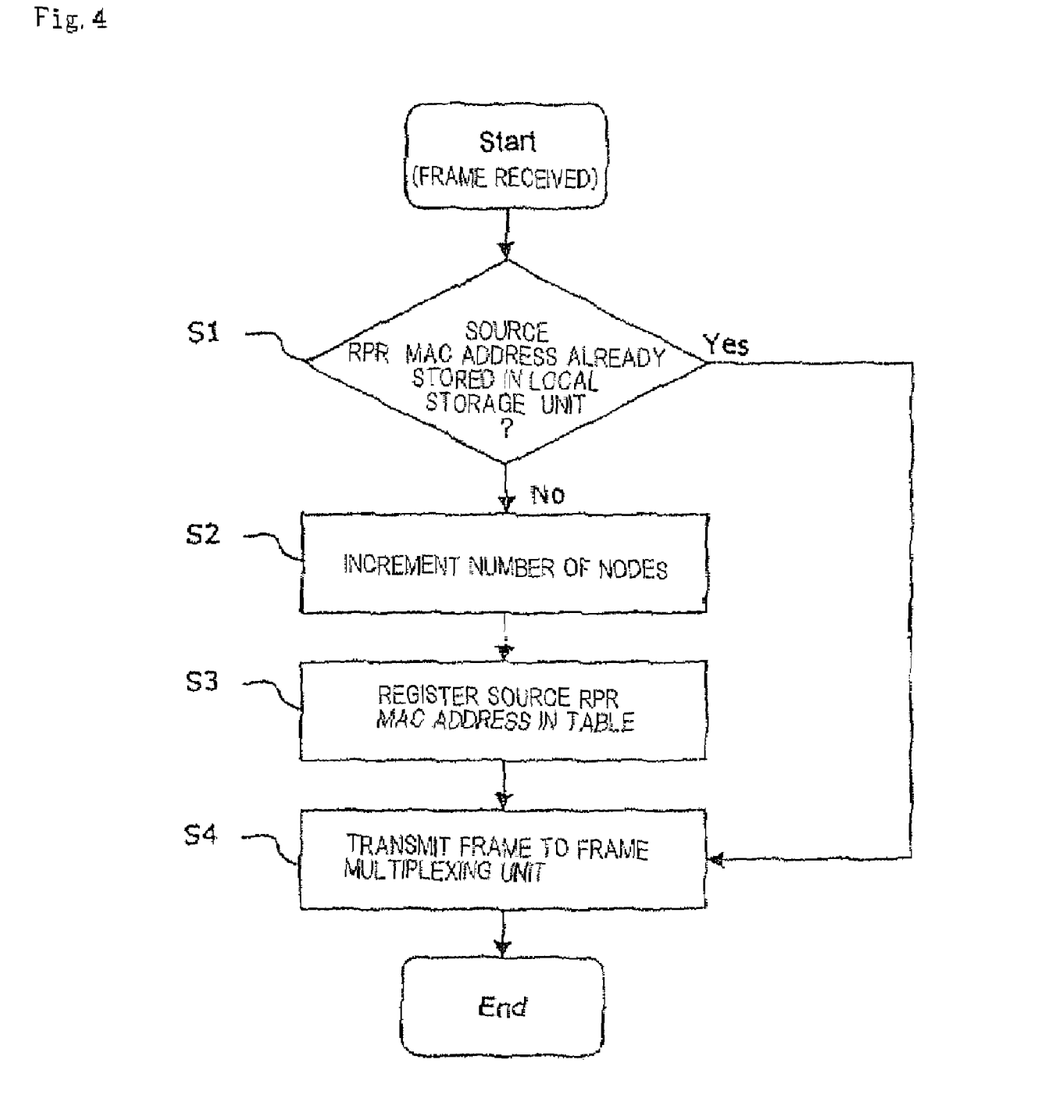
FIG. 4 is a flow chart showing an exemplary process for counting the number of nodes, executed by a node counting unit.

FIG. 4 is a flow chart showing an exemplary process for counting the number of nodes, executed by the node counting unit.

When an RPR frame of a fairness controlled traffic packet received from an upstream RPR node is transferred to node counting unit 480-1, node counting unit 480-1 performs the following process.

As shown in FIG. 4, as node counting unit 480-1 receives the RPR frame of the fairness controlled traffic packet, node counting unit 480-1 determines whether or not the source RPR MAC address has been registered in its local storage device with reference to the source RPR MAC address of the RPR frame (step S1).

When the source RPR MAC address is not registered in the local storage device, node counting unit 480-1 increments the value of the variable indicative of the number of nodes by one (step S2).

Next, node counting unit 480-1 registers the entered source RPR MAC address of the RPR frame in the local storage device (step S3), and sends the RPR frame to frame multiplexing unit 440-1 (step S4).

When the source RPR MAC address has been registered in the local storage device, node counting unit 480-1 goes to processing at step S4 to send the RPR frame to frame multiplexing unit 440-1.

When determining that congestion occurs, fairness control unit 460-1 reads the value of the variable indicative of the number of nodes, held in node counting unit 480-1, from node counting unit 480-1. Then, fairness control unit 460-1 executes the calculation of Equation (5) using the value of the variable instead of "numStations" to calculate an initial value for the fair rate. IN this event, the initial value for the fair rate may be calculated using Equation (6) instead of Equation (5).

While the number of RPR nodes which are transmitting fairness controlled traffic packets which pass through the local node is preferably constant even if a long time elapses, the number of such nodes can frequently vary in some cases. As such, node counting unit 480-1 may initialize the variable indicative of the number of RPR nodes which are transmitting fairness controlled traffic packets that pass through the local node every predetermined time.

Figure 5:
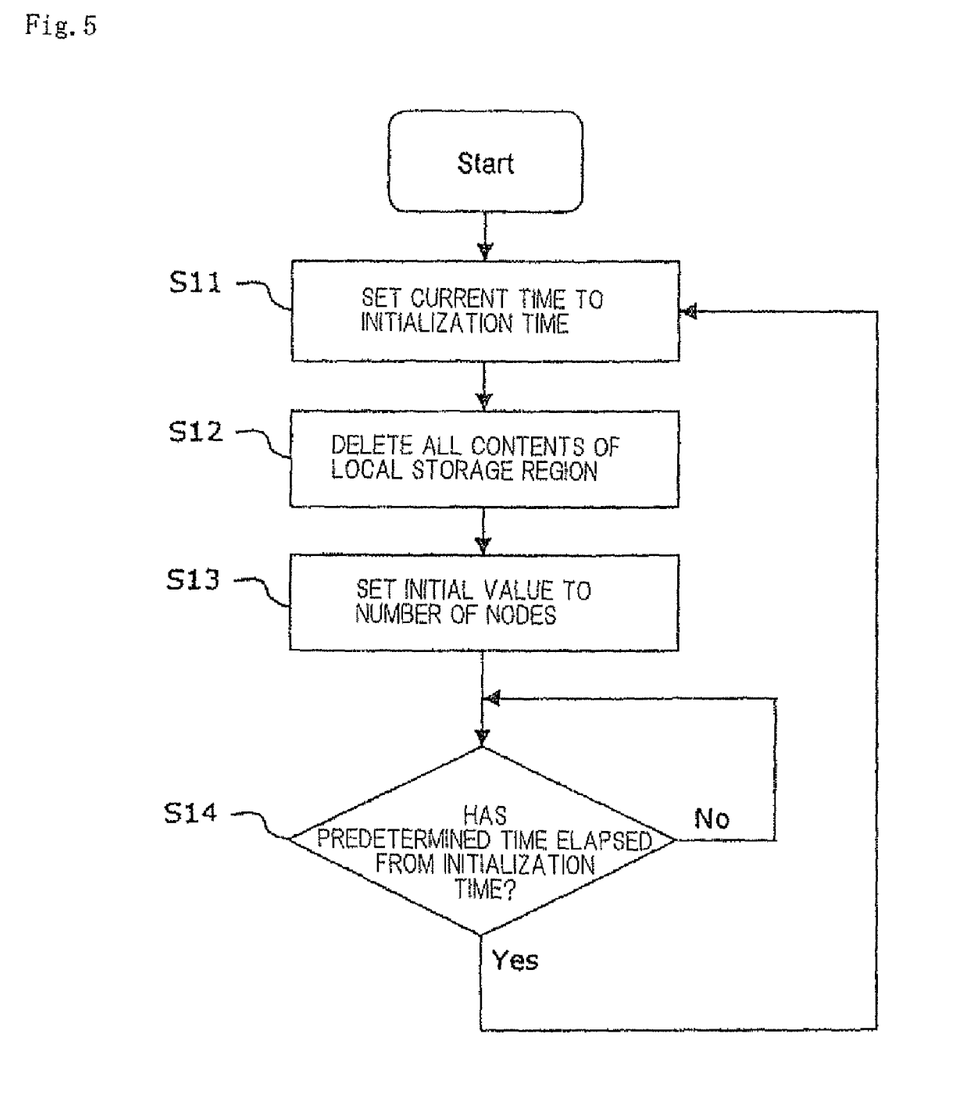
FIG. 5 is a flow chart showing an exemplary process for initializing a variable, executed by the node counting unit.

FIG. 5 is a flow chart showing an exemplary process for initializing the variable, executed by the node counting unit.

As shown in FIG. 5, node counting unit 480-1 first sets the current time to an initialization time (time at which the initialization is performed) (step SI 1). Next, node counting unit 480-1 deletes all source RPR MAC addresses stored in the local storage device (step S12).

Upon completion of the processing at step S12, node counting unit 480-1 initializes the variable indicative of the number of RPR nodes which are transmitting fairness controlled traffic packets that pass through the local node (step S13). At step 13, the value of the variable is set to a predetermined initial value. The initial value may be set in accordance with the value of the variable before the initialization. For example, one-half of the value of the variable before the initialization may be set to the initial value. However, the initial value is not limited to one-half of the value of the variable before initialization. Also, an average value of values immediately before initialization may be used for the initial value. By thus setting the initial value based on the value of the variable before initialization, it is possible to prevent an overestimated Initial value for the fair rate even if congestion occurs immediately after initialization.

Upon completion of processing at step S13, node counting unit 480-1 determines whether or not a predetermined time has elapsed from the initialization time set at step S11 (step S14). When the predetermined time has elapsed from the initialization time, node counting unit 480-1 returns to processing at step S11 to repeat the processing at steps S11-S14. When the predetermined time has not elapsed from the initialization time, node counting unit 480-1 again executes processing at step S14.

When the value of the variable is set to an initial value other than zero in the processing at step S13, node counting unit 480-1 determines whether or not the value of the variable is equal to the number of source RPR MAC addresses registered in the local storage device immediately before step S2 shown in FIG. 4. Then, when the value of the variable is equal to the number of source RPR MAC addresses, node counting unit 480-1 increments the variable before it goes to processing at step S3. On the other hand, when the value of the variable is different from the number of source RPR MAC addresses, node counting unit 480-1 goes to processing at step S3 without executing the processing at step S2. As an example of setting the value of the variable to an initial value other than zero, the variable may be initialized in accordance with the value of the variable before the initialization, as described above.

While the foregoing description has been given of the operation of node counting unit 480-1 and fairness control unit 460-1, node counting unit 480-2 and fairness control unit 460-2 operate in a similar manner as well.

According to the second embodiment a more appropriate initial value for the fair rate can be calculated because the initial value for the fair rate is calculated using the number of RPR nodes which transmit fairness controlled traffic packets using a link on which congestion occurs.

Next, a description will be given of an exemplary modification to the second embodiment.

In the following exemplary modification, the node counting unit counts the number of RPR nodes which are transmitting fairness controlled traffic packets which passes through the local node utilizing TTL (Time to Live) included in a data frame of the fairness controlled traffic packet.

TTL is stored in the header of the RPR frame. TTL is decremented by one each time an RPR frame is transferred to an adjacent RPR node. As TTL reaches zero, a corresponding RPR frame is deleted from the RPR network. It is the RPR node which decrements the value of TTL and deletes the RPR frame, the TTL of which reaches zero.

The following description will be given of an exemplary modification to the second embodiment giving node counting unit 480-1 as an example. Node counting units 480-1, 480-2 of this exemplary modification may not register the source RPR MAC address in the internal storage device.

As a data frame of the fairness controlled traffic packet is transmitted from traffic rate measuring unit 470-1, node counting unit 480-1 calculates the difference between TTL stored in the data frame and an initial value for the TTL. This difference is called the "number of hops."

Node counting unit 480-1 compares the value of the variable indicative of the number of RPR nodes which transmit fairness controlled traffic packets using the link on which the congestion occurs with the number of hops, and updates the value of the variable to the number of hops when the number of hops is larger.

With the RPR frame, a value stored in the RPR frame may be used for the initial value for TTL. While the description is given in connection with an example where the communication network is an RPR network, the initial value for TTL may be set to a predetermined value in each node, and the node counting unit of each node may store the predetermined value in a storage device (not shown) as the initial value for TTL when a communication protocol other than RPR is applied to the frame.

Figure 6:
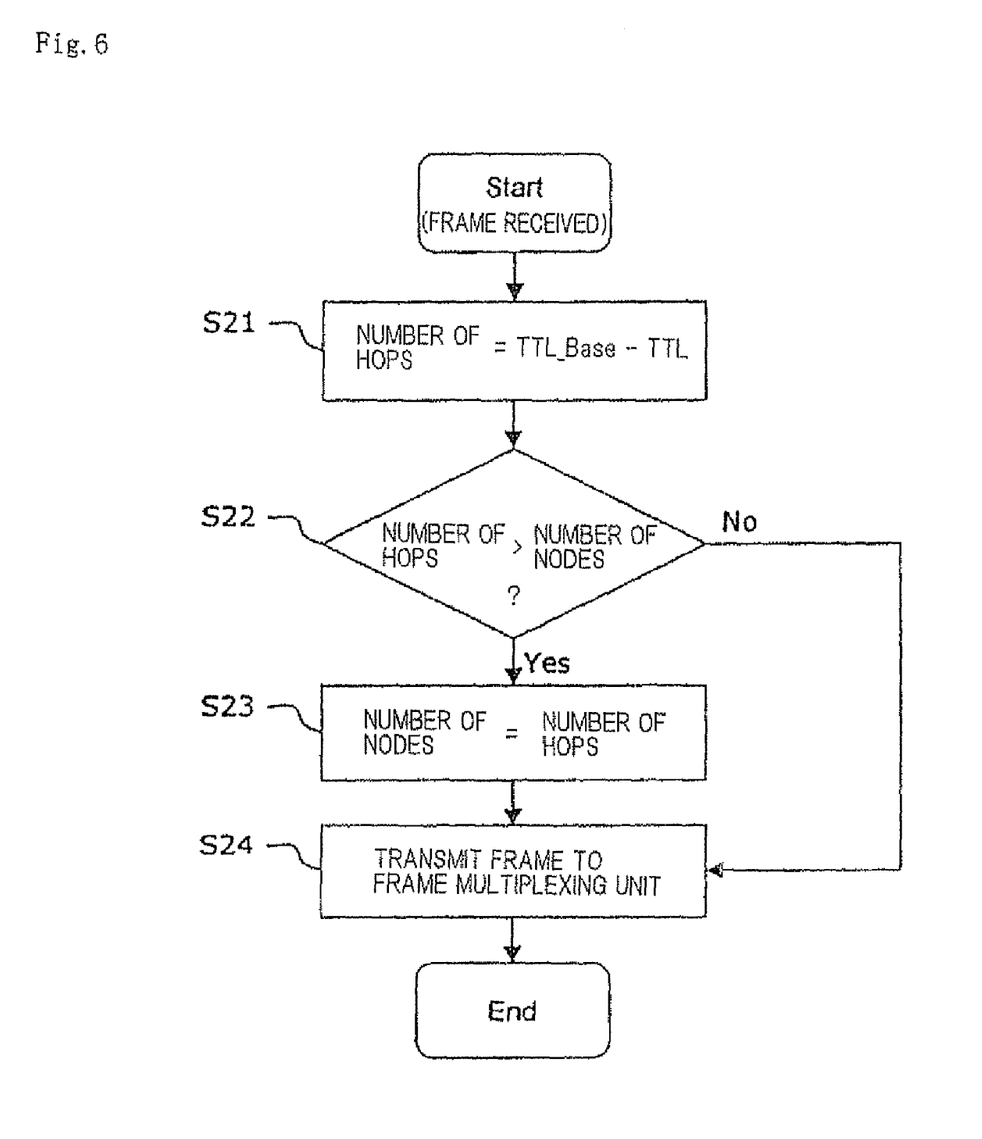
FIG. 6 is a flow chart showing an exemplary modification to the node counting process executed by the node counting unit.

FIG. 6 is a flow chart showing an exemplary modification to the process for counting the number of nodes, executed by the node counting unit.

As input port 400-1 receives a data frame of the fairness controlled traffic packet from an upstream RPR node and sends the data frame to node counting unit 480-1, node counting unit 480-1 performs the following process. It should be noted that the data frame is a frame other than control frames. In this example, the data frame refers to an RPR frame which stores an Ethernet frame transmitted by a terminal.

As shown in FIG. 6, node counting unit 480-1 receives a data frame of the fairness controlled traffic packet, and finds the difference between TTL stored in the data frame and an initial value for TTL ($TTL_{13}$ Base in FIG. 6) (step S21). Specifically, node counting unit 480-1 subtracts the value of TTL stored in the data frame from the initial value for the TTL. The result of this subtraction is the number of hops.

Next, node counting unit 480-1 determines whether or not the number of hops is larger than the value of a variable indicative of the number RPR nodes which transmit fairness controlled traffic packets using a link on which congestion occurs (step S22).

When the number of hops is larger than the value of variable, node counting unit 480-1 updates the value of the variable to the number of hops (step S23). In other words, the number of hops is substituted into the variable. Subsequently, node counting unit 480-1 sends the data frame to frame multiplexing unit 440-1 (step S24).

When the number of hops is smaller than the value of the variable, node counting unit 480-1 goes to processing at step S24, where an RPR frame is sent to frame multiplexing unit 440-1.

Next, a description will be given of a process for initializing the variable in the exemplary modification to the second embodiment.

Figure 7:
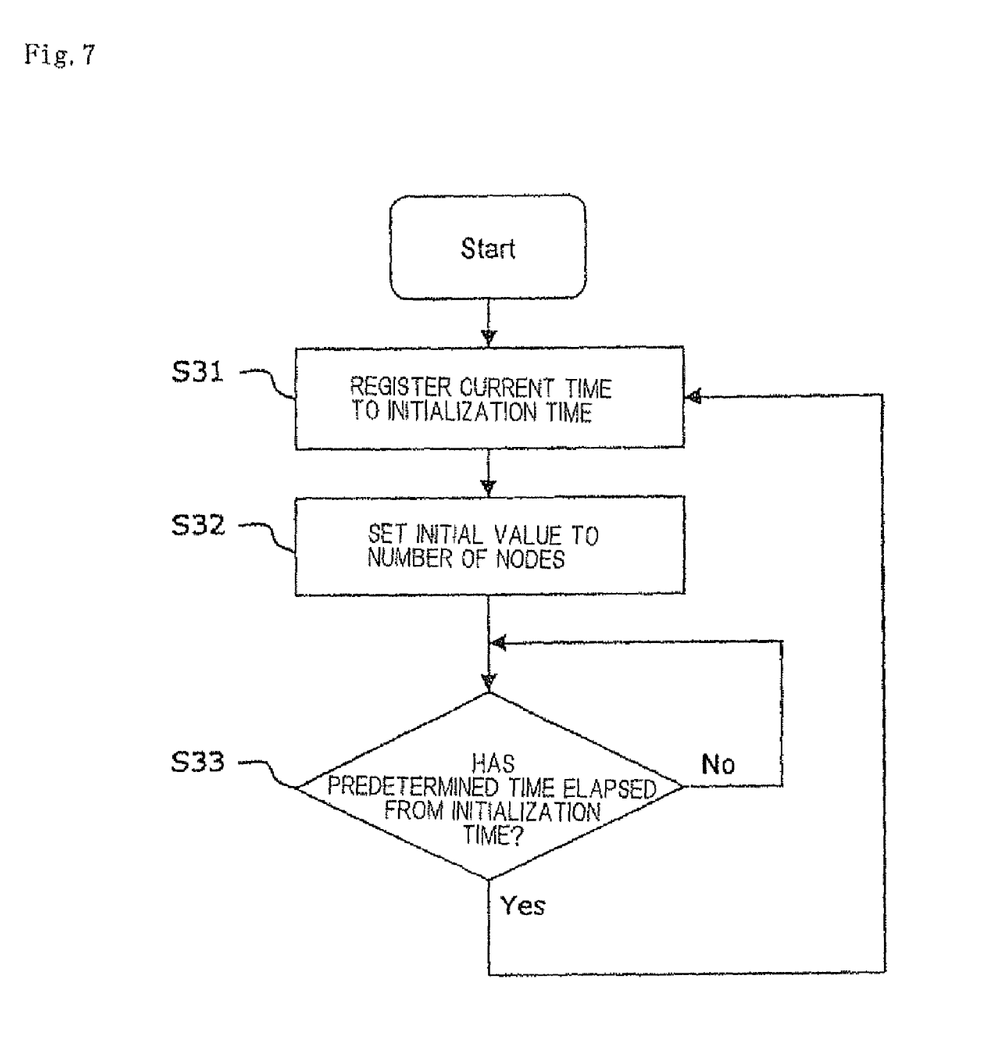
FIG. 7 is a flow chart showing an exemplary modification to the variable initialization process executed by the node counting unit.

FIG. 7 is a flow chart showing an exemplary modification to the process for initializing the variable, executed by the node counting unit.

As shown in FIG. 7, node counting unit 480-1 sets the current time to an initialization time (time at which the initialization is performed) (step S31). This processing is similar to the processing at step S11 described above.

Subsequently, node counting unit 480-1 initializes the variable indicative of the number of RPR nodes which are transmitting fairness controlled traffic packets which pass through the local node (step S32) This processing is similar to the processing at step S13 described above.

Upon completion of the processing at step S32, node counting unit 480-1 determines whether or not a predetermined time has elapsed from the initialization time set at step S31 (step S33). When the predetermined time has elapsed from the initialization time, node counting unit 480-1 returns to the processing at step S31 to repeat the processing at steps S31-S33. When the predetermined time has not elapsed from the initialization time, node counting unit 480-1 again executes the determination processing at step S33. The processing at step S33 is similar to the processing at step S14 described above The operation of the exemplary modification except for the foregoing is similar to that of the second embodiment.

According to the exemplary modification to the second embodiment, since the initial value for the fair rate is calculated using the number of nodes up to the one located furthest among the nodes which transmit best-effort traffic packet using a link on which congestion occurs, a more appropriate initial value for the fair rate can be calculated.

The foregoing first and second embodiments have been described in connection with a communication network which is an RPR network, by way of example. The present invention can also be applied to nodes other than RPR nodes as long as they belong to a communication network which conducts band control for a traffic packet which uses an arbitrary link of a communication system in order to fairly use a communication band of the link.

For example, the present invention may be applied to nodes of an MPLS (Multi Protocol Label Switching) network which has LPS (Label Switched Path) as a communication path. In other words, the node of the present invention may be a node which forms part of MPLS which has LSP as a communication path.

When a communication network is not a ring network as the RPR network, and the initial value for the fair rate is calculated using the previously stored number of nodes in a manner similar to the first embodiment, each node may store the number of nodes located upstream of the node itself in TDB as topology information. Then, the number of nodes may be used for calculating the initial value for the fair rate.

Figure 8:
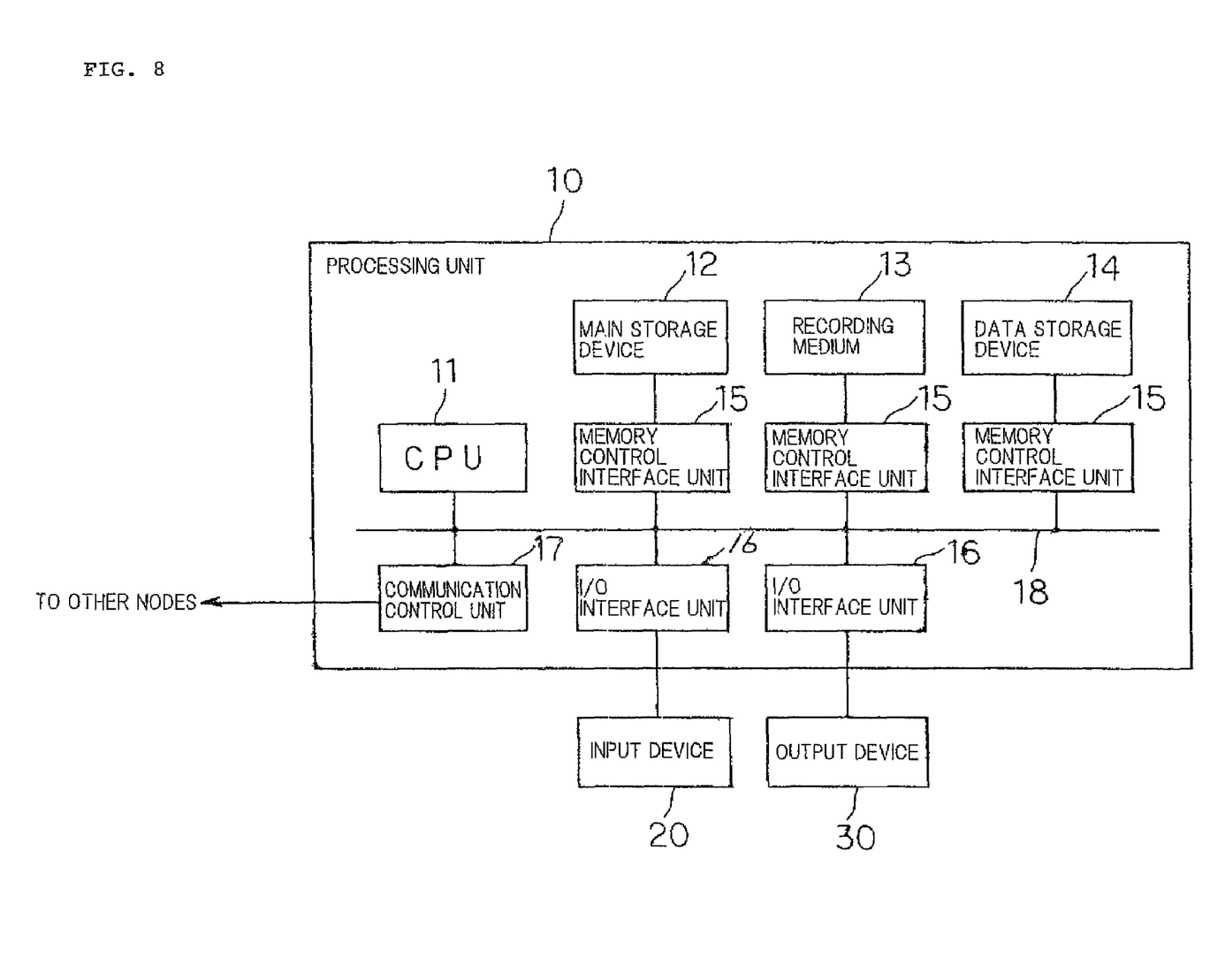
FIG. 8 is a block diagram showing another exemplary configuration of a node according to the present invention.

Also, while the first and second embodiments have shown a node which comprises processing units such as fairness control units 460-1, 460-2 and the like, the node shown in the first and second embodiments can be implemented by a computer shown in FIG. 8 as well.

The computer shown in FIG. 8 comprise processing unit 10 for executing predetermined processes according to programs; input device 20 for applying commands, information and the like to processing unit 10; and output device 30 for monitoring the results of the processes by processing unit 10.

Processing unit 10 comprises CPU 11; main storage device 12 for temporarily holding information required for processing in CPU 11; recording medium 13 having recorded thereon a program for causing CPU 11 to execute processing of the aforementioned frame analysis units 410-1, 410-2, RPR switch processing unit 420, frame multiplexing units 440-1, 440-2, fairness control units 460-1, 460-2, traffic rate measuring units 470-1, 470-2, and node counting units 480-1, 480-2; data storage device 14 for use as topology database 430; memory control interface unit 15 for controlling data transfers to/from main storage device 12, recording medium 13, and data storage device 14; I/O interface unit 16 which is an interface device with input device 20 and output device 30; and communication control device 17 which is an interface for controlling communications with adjacent nodes. These components are interconnected through bus 18.

Processing unit 10 executes processing of the aforementioned frame analysis units 410-1, 410-2, RPR switch processing unit 420, frame multiplexing units 440-1, 440-2, fairness control units 460-1, 460-2, traffic rate measuring units 470-1, 470-2, and node counting units 480-1 480-2 in accordance with programs recorded on recording medium 13. Recording medium 13 may be a magnetic disk, a semiconductor memory, an optical disk, or other recording media.

The present invention is suitably applied to a node and a communication system which force traffic packets to share the communication band of a link.

While the invention has been particularly shown and described with reference to exemplary embodiments thereof, the invention is not limited to these embodiments. It will be understood by those ordinarily skilled in the art that various changes in form and details may be made therein without departing from the spirit and scope of the present invention as defined by the claims.

What is claimed is:

1. A node for calculating a fair rate indicative of a predetermined upper limit value for a communication band, said fair rate being defined for a fairness controlled traffic packet having the communication band controlled to the upper limit value or less, for transmission to other nodes of a communication system to which said node belongs, said node comprising:

a traffic rate measuring unit for measuring a communication band of the fairness controlled traffic packet sourced from said node, and a communication band of the fairness controlled traffic packet which passes through said node; and a fairness control unit for calculating the fair rate by dividing a communication band available for a transmission of the fairness controlled traffic packet, found using the communication band of the fairness controlled traffic packet sourced from said node and the communication band of the fairness controlled traffic packet which passes through said node, by the number of nodes which transmit the fairness controlled traffic packet using a link on which congestion occurs, wherein said fairness control unit is configured to:

subtract a communication band of band guaranteed traffic packet having a guaranteed communication band, from a communication band of a link which connects an adjacent node and said node;

calculate a communication band available for a transmission of the fairness controlled traffic packet by further subtracting the sum of a communication band of the band guaranteed traffic packet sourced from said node and a communication band of the band guaranteed traffic packet which passes through said node from the resulting difference; and calculate the sum of the communication band of the band guaranteed traffic packet sourced from said node and the communication band of the band-guaranteed traffic packet which passes through said node from a communication band measured by said traffic rate measuring unit.

2. The node according to claim 1, wherein said fairness control unit is configured to:

calculate a communication band available for a transmission of the fairness controlled traffic packet by adding the communication band of the fairness controlled traffic packet sourced from said node and the communication band of the fairness controlled traffic packet which passes through said node.

3. The node according to claim 1, comprising a topology database for holding the number of nodes which make up a communication system, wherein:

said fairness control unit uses the number of nodes held in said topology database as the number of nodes which transmit the fairness controlled traffic packet using a link on which congestion occurs.

4. A node for calculating a fair rate indicative of a predetermined upper limit value for a communication band, said fair rate being defined for a fairness controlled traffic packet having the communication band controlled to the upper limit value or less, for transmission to other nodes of a communication system to which said node belongs, said node comprising:

a traffic rate measuring unit for measuring a communication band of the fairness controlled traffic packet sourced from said node, and a communication band of the fairness controlled traffic packet which passes through said node;

a fairness control unit for calculating the fair rate by dividing a communication band available for a transmission of the fairness controlled traffic packet, found using the communication band of the fairness controlled traffic packet sourced from said node and the communication band of the fairness controlled traffic packet which passes through said node, by the number of nodes which transmit the fairness controlled traffic packet using a link on which congestion occurs;

a local storage device for storing a source node identifier indicative of a source node of a frame stored in the frame for transmitting and receiving the fairness controlled traffic packet; and a node counting unit for determining, when receiving the frame, whether or not a source node identifier stored in the frame is stored in said local storage device, storing the source node identifier in said local storage device when the source node identifier is not stored in said local storage device, and setting a value indicative of the number of nodes which transmit the fairness controlled traffic packet which passes through said node based on the number of source node identifiers stored in said local storage device.

5. A node for calculating a fair rate indicative of a predetermined upper limit value for a communication band, said fair rate being defined for a fairness controlled traffic packet having the communication band controlled to the upper limit value or less, for transmission to other nodes of a communication system to which said node belongs, said node comprising:

a traffic rate measuring unit for measuring a communication band of the fairness controlled traffic packet sourced from said node, and a communication band of the fairness controlled traffic packet which passes through said node;

a fairness control unit for calculating the fair rate by dividing a communication band available for a transmission of the fairness controlled traffic packet, found using the communication band of the fairness controlled traffic packet sourced from said node and the communication band of the fairness controlled traffic packet which passes through said node, by the number of nodes which transmit the fairness controlled traffic packet using a link on which congestion occurs; and a node counting unit for subtracting a value of Time to Live stored in a frame for transmitting and receiving the fairness controlled traffic packet from a previously set initial value for Time to Live to determine a value indicative of the number of nodes which transmit the fairness controlled traffic packet which passes through said node based on a maximum value of the subtraction result.

6. The node according to claim 4, wherein said node counting unit sets a variable indicative of the number of nodes which transmit the fairness controlled traffic packet which pass through said node to an initial value for every predetermined period.

7. The node according to claim 6, wherein said node counting unit sets an initial value for the variable indicative of the number of nodes which transmit the fairness controlled traffic packet which pass through said node based on a value before initialization.

8. The node according to claim 1 which forms part of a Multi Protocol Label Switching network having Label Switched Path as a communication path.

9. The node according to claim 1 which forms part of a Resilient Packet Ring Network having a ringlet as a communication path.

10. A communication system comprising:
a plurality of the nodes according to claim 1; and
a plurality of communication paths for interconnecting said nodes.

11. A fair rate calculating method for calculating a fair rate indicative of a predetermined upper limit value for a communication band of a fairness controlled traffic packet having the communication band controlled to the upper limit value, said method comprising:
measuring a communication band of the fairness controlled traffic packet sourced from said node, and a communication band of the fairness controlled traffic packet which passes through said node;
calculating the fair rate by dividing a communication band available for a transmission of the fairness controlled traffic packet, found using the communication band of the fairness controlled traffic packet sourced from said node and the communication band of the fairness controlled traffic packet which passes through said node by the number of nodes which transmit the fairness controlled traffic packet using a link on which congestion occurs;
subtracting a communication band of band guaranteed traffic packet having a guaranteed communication band, from a communication band of a link which connects an adjacent node and said node;
calculating a communication band available for a transmission of the fairness controlled traffic packet by further subtracting the sum of a communication band of the band guaranteed traffic packet sourced from said node and a communication band of the band guaranteed traffic packet which passes through said node from the resulting difference; and
calculating the sum of the communication band of the band guaranteed traffic packet sourced from said node and the communication band of the band-guaranteed traffic packet which passes through said node from a communication band measured by said traffic rate measuring unit.

12. A recording medium having recorded thereon a program for calculating a fair rate indicative of a predetermined upper limit value for a communication band of a fairness controlled traffic packet having the communication band controlled to the upper limit value, said program causing a computer to:
measure a communication band of the fairness controlled traffic packet sourced from said node, and a communication band of the fairness controlled traffic packet which passes through said node;
calculate the fair rate by dividing a communication band available for a transmission of the fairness controlled traffic packet, found using the communication band of the fairness controlled traffic packet sourced from said node and the communication band of the fairness controlled traffic packet which passes through said node by the number of nodes which transmit the fairness controlled traffic packet using a link on which congestion occurs;
subtract a communication band of band guaranteed traffic packet having a guaranteed communication band, from a communication band of a link which connects an adjacent node and said node;
calculate a communication band available for a transmission of the fairness controlled traffic packet by further subtracting the sum of a communication band of the band guaranteed traffic packet sourced from said node and a communication band of the band guaranteed traffic packet which passes through said node from the resulting difference; and
calculate the sum of the communication band of the band guaranteed traffic packet sourced from said node and the communication band of the band-guaranteed traffic packet which passes through said node from a communication band measured by said traffic rate measuring unit.

* * * * *